Dec. 30, 1969     TAKEO HORI     3,486,540

ELECTRIC PENCIL SHARPENER

Filed April 3, 1967     5 Sheets-Sheet 1

Dec. 30, 1969 TAKEO HORI 3,486,540
ELECTRIC PENCIL SHARPENER
Filed April 3, 1967 5 Sheets-Sheet 2

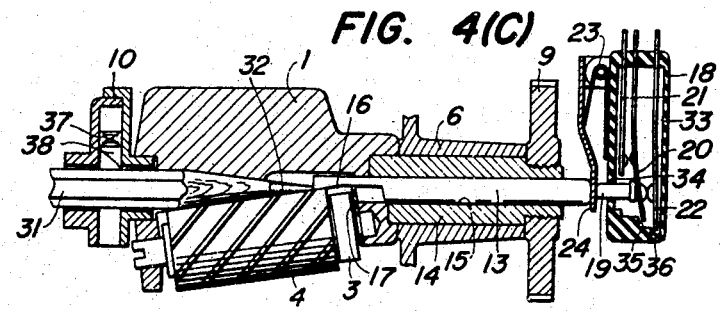
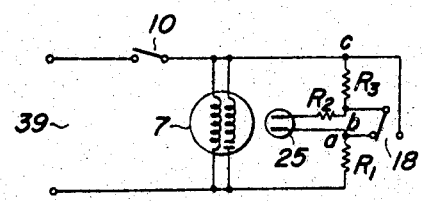
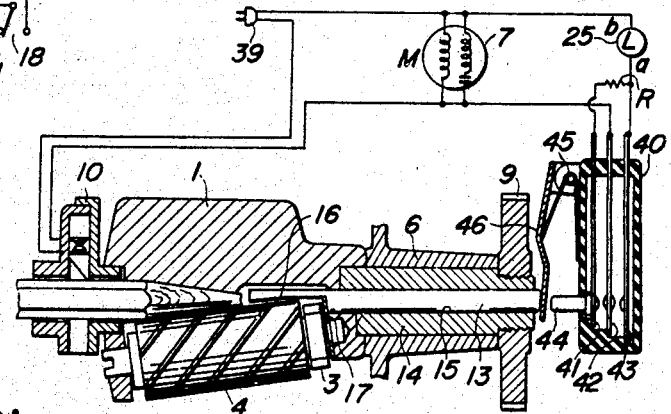
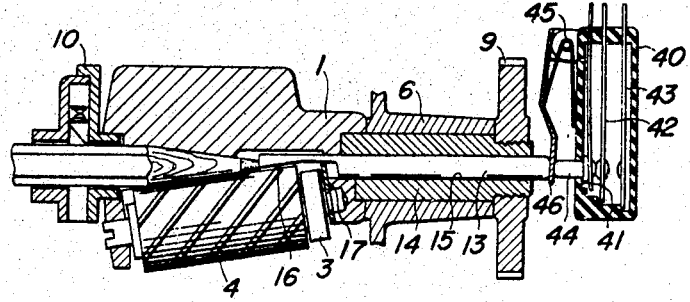

United States Patent Office 3,486,540
Patented Dec. 30, 1969

3,486,540
ELECTRIC PENCIL SHARPENER
Takeo Hori, Fukuoka-shi, Japan, assignor to Matsushita
Electric Industrial Co., Ltd., Osaka, Japan
Filed Apr. 3, 1967, Ser. No. 628,102
Claims priority, application Japan, Apr. 7, 1966,
41/22,591
Int. Cl. B43l 23/00
U.S. Cl. 144—28.5                                    7 Claims

ABSTRACT OF THE DISCLOSURE

An electrical pencil sharpener comprising an indicator lamp whereby to change gradationally the functioning of said indicating means and thus signal how the electric current is flowing within the whole circuit network or the degree of progress of the pencil sharpening operation.

BACKGROUND OF THE INVENTION

Field of the invention

The present invention aims at improvement, in an electric pencil sharpener, of an indicating means for signaling completion of the pencil sharpening operation, wherein the indicating means is adapted to change its functioning gradationally so that an indicator lamp is lit in two different stages of dim and bright conditions.

SUMMARY OF THE INVENTION

An electric pencil sharpener comprising a switch for a motor, which is operated to close upon insertion of a pencil into the pencil sharpener unit and open upon withdrawal of the same thereout, a pencil sharpening means driven by a motor, an indicator switch actuated upon being pushed by the lead point of a pencil under operation and an indicating means actuated through the functioning of said indicator switch, whereby to change gradationally the functioning of said indicating means through the action of said indicator switch to the effect of reducing the resistance across said indicating means, enabling it therefore to obtain conveniently a pencil point of the desired degree of finish either dull or sufficiently sharp by withdrawal of the pencil under operation either at the time the indicator lamp is lit dim or after it beams brighter.

BRIEF DESCRIPTION OF THE DRAWING

FIGURES 4A, 4B and 4C explain the functioning of a switch mechanism shown as another preferred embodiment of the present invention;

FIGURE 5 is a wiring diagram for the sharpener unit shown in FIGURES 4A, 4B and 4C;

FIGURES 6A, 6B and 6C illustrate the functioning of a switch mechanism as still another preferred embodiment of the present invention;

DESCRIPTION OF THE PREFERRED EMBODIMENTS

Figure 1:
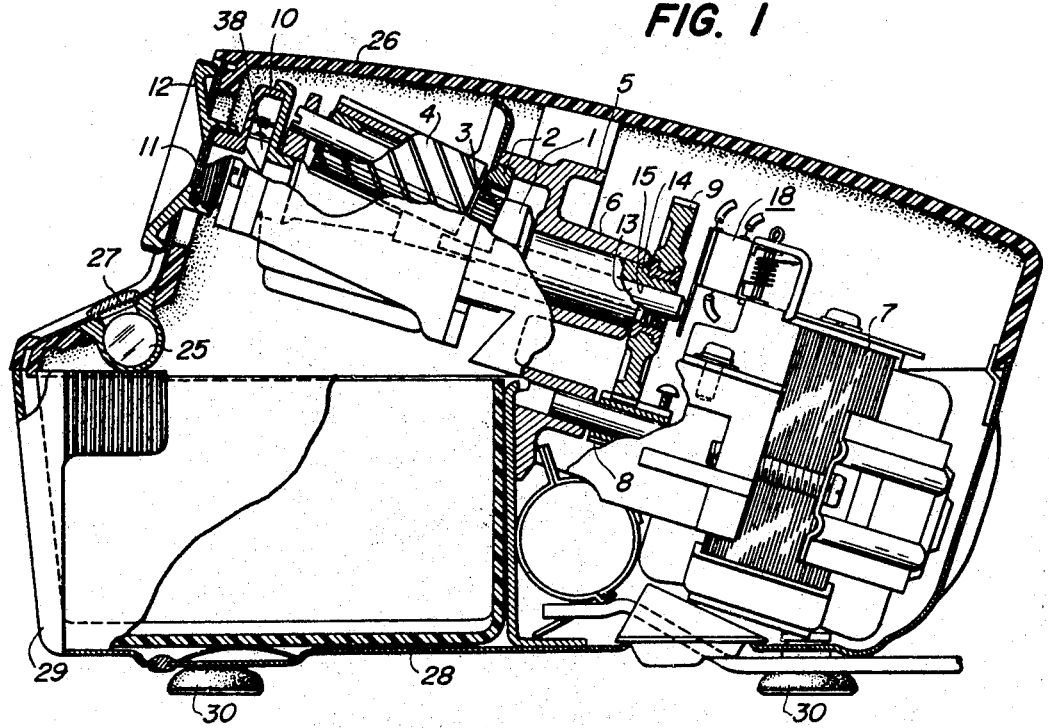
FIGURE 1 is a vertical sectional side view of the essential part of an electric pencil sharpener shown as a preferred embodiment of the present invention.

The object of the present invention is directed to improvement, in an electric pencil sharpener, of an indicating means for signaling completion of the pencil sharpening operation, wherein said indicating means is adapted to change its functioning gradationally, whereby a provided electric lamp is lit in two different stages of dim and bright conditions. Description will now be made in the following with reference to the accompanying drawings.

In the preferred embodiments shown in FIGURES 1, 2A, 2B and 2C, reference numeral 1 denotes a cutter holder which is supported by a bearing portion 6 of the frame 5 and rotatably supports a cutter 4 secured to a pinion gear 3 which is in mesh with an internal gear 2, the rotation of the motor 7 being transmitted to the cutter holder 1 by way of gears 8 and 9. In the front part of said cutter holder 1 is mounted a power switch 10 which is operated to close to drive the motor 7 upon insertion of a pencil 31 into the sharpener unit, and open upon withdrawal of the pencil from the sharpener unit, and further, in the forward part of said power switch 10 is mounted a socket member 12 comprising a pencil guiding bore 11. Numeral 13 designates a sliding rod movable axially through a bore 15 drilled through the center of the drive shaft 14 of said cutter holder 1 which is provided with a notch 16 about the periphery thereof and at the bottom of said notch is fittingly received an abutment plate 17 by which said sliding rod 13 is prevented from rotation and axial displacement out of the bore 15. Numeral 18 shows an indicator lamp switch which is operated by means of said sliding rod 13 moving axially upon being pushed by the lead point 32 of a pencil 31 under sharpening operation. Said switch 18 consists of a central conducting plate 20 which is in contact with a button 19, a button-side conducting plate 21 which normally is in contact with said central conducting plate 20 but stays apart from the button 19, a contra button-side conducting plate 22 which normally stays apart from the central conducting plate 20, and an abutment plate 24 being urged by a coil spring 23 in the separating direction so that the free-end of the abutment plate 24 is in contact with the sliding rod 13. Numeral 25 signifies an indicator lamp which is provided in the front face of the upper casing 26 and is shown in the form of a neon lamp in this example, being observable of its lit condition externally through a window 27. Indicated by 28 is a lower casing, by 29, a box for collecting pencil shavings, and by 30, one of supporting rubber cushions.

Description will hereinafter be made in more detail about said switch 18. The button-side conducting plate 21 the central conducting plate 20 and the contra button-side conducting plate 22 are enclosed in a housing 33 and one end of the respective conducting plates 21, 20 and 22 is fixedly supported by, and extending outwardly through, one of the side walls of the housing 33. In the side wall opposite the conducting plate 21 of the housing 33 is provided a through aperture 34 for receiving the button 19 therethrough, whose head is in engagement with the conducting plate 20 and whose other end is adapted to be engageable with the abutment plate 24. In the interior surface of the side wall opposite to the free end of the conducting plate 20 of the housing 33 are provided a step-off section 35 for preventing the conducting plate 20 from lateral displacement toward the button 19 side, and another step-off section 36 for checking the conducting plate 22 from displacement to the side of the conducting plate 20. In the exterior of the side wall of the housing 33, opposite to the side where the end of the sliding rod 13 is in place, is pivotally mounted the abutment plate 24 whose free-end is so urged by the coil spring 23 as to abut upon the end of the sliding rod 13. The conducting plate 21 is connected to the power source via power-plug 39 across the contact 37 of the power switch 10, and the conducting plate 22 is likewise connected to the power-plug 39 across resistance $R_2$, while the motor 7 and the series circuit including the indicator lamp 25 and resistance $R_1$ are respectively connected in parallel with the circuit of power plug 39 across the power switch 10. The conducting plate 20 is connected to the point $b$ where the lamp 25 and resistance $R_1$ adjoin.

Figure 3:
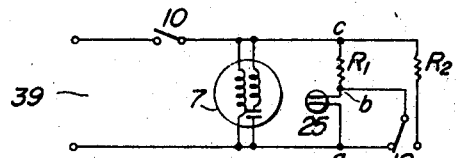
FIGURE 3 is a wiring diagram for the sharpener unit shown in FIGURES 2A, 2B and 2C.

Further detail of the electric circuitry is shown in FIGURE 3. The motor 7 is connected to the power source via power plug 39 across the power switch 10, while the series circuit containing resistance $R_1$ and lamp 25 is likewise connected in parallel with the circuit of said motor 7, the lamp-side end $a$ of said series circuit including resistance $R_1$ and lamp 25 is connected to said button-side conducting plate 21 of the switch 18, the central conducting plate 20 is connected to the central point $b$ between resistance $R_1$ and lamp 25, and further, the contra button-side conducting plate 22 is connected to the other end $c$ of said series circuit across resistance $R_2$.

Description will hereinafter be made with regard to the operation of the present invention embodied in the preceding example.

Figure 2A:
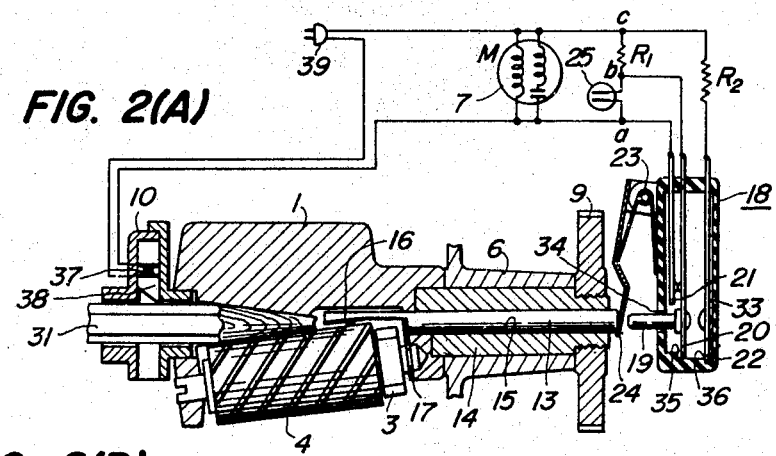
FIGURES 2A, 2B and 2C illustrate the functionings of a switch mechanism embodied in the present invention.
Figure 2B:
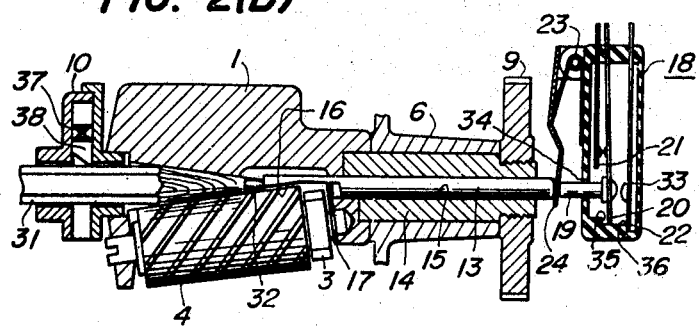
Figure 2C:
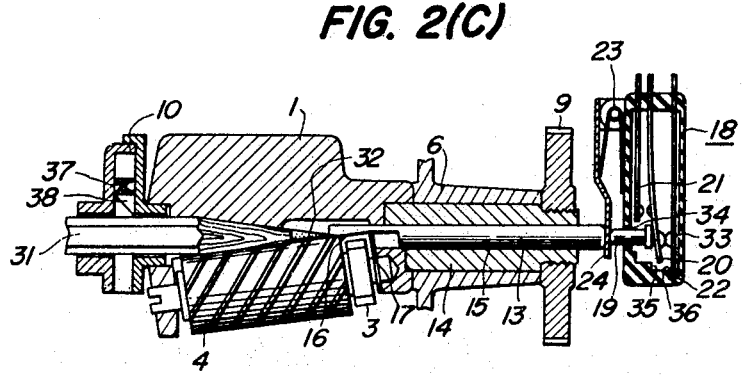

When a pencil being sharpened is inserted through the pencil guiding bore 11 of the socket member 12, the power switch 10 circuit is closed as shown in FIGURE 2A by the function of an operating member 38 to start the motor 7, impart rotation to the cutter holder 1 and thus begin the pencil 31 sharpening operation. At this time, in the lamp 25 circuit, said button-side conducting plate 21 of the switch 18, being in contact with said central conducting plate 20, the lamp 25 will not be energized because there is an internal resistance through the lamp 25, and the power energy will be consumed across resistance $R_1$, the result being that the lamp is not lit. As the sharpening operation goes on until the lead point 32 of the pencil 31 is substantially sharpened as shown in FIGURE 2B, the sliding rod 13 slides axially, being pushed by the pencil point, whereby the button 19 for the switch 18 is pushed from abutment plate 24, and the central conducting plate 20 comes apart from the button-side conducting plate 21 so that the lamp 25 circuit is energized across resistance $R_1$ and cause the lamp to be lit dim. When the lead point 32 is cut sharp enough by further sharpening operation and thus the pencil sharpening has been completed as shown in FIGURE 2C, the sliding rod 13, being pushed by the lead point 32, slides more distance axially and the button 19 for the switch 18 is likewise subjected to the increased axial pressure, the result, therefore, being that central conducting plate 20 comes into contact with contra button-side conducting plate 22, this meaning that resistance $R_2$ results in being connected in parallel with the circuit of resistance $R_1$ to the effect of reducing the circuit resistance so that the lamp 25 is supplied with a greater amount of electric current and beams brighter.

Figure 4A:
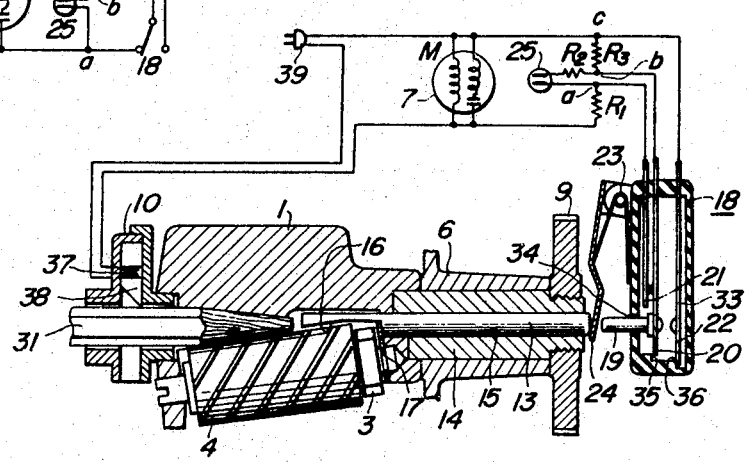
Figure 4B:
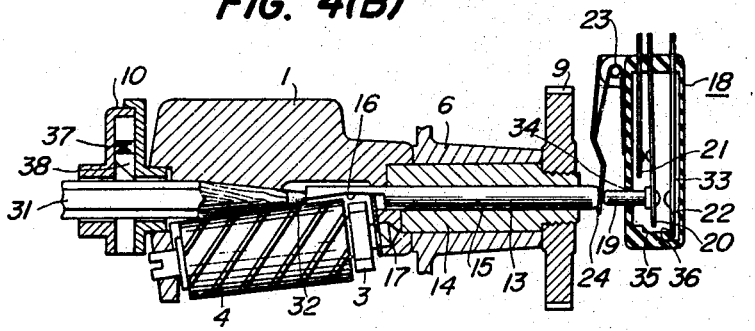

Description will now be made in reference to another preferred embodiment of the present invention shown in FIGURES 4A, 4B and 4C, whereof, however, detailed explanation shall be omitted since the indicator switch as well as the mechanical structure shown in the example of FIGURES 4A, 4B and 4C is identical with those in the other examples described hereinabove, but similar characters of reference will be used to designate like components in the description. The electric circuitry of the example of FIGURES 4A, 4B and 4C will be described with reference to FIGURE 5: the motor 7 is connected across the contact point 37 of power switch 10 to the power source via power plug 39, while the series lamp circuit containing resistance $R_1$, indicator lamp 25, resistance $R_2$ and resistance $R_3$ is connected to the power source in parallel with the circuit of said motor 7. In said series circuit, the lamp-side contact $a$ of resistance $R_1$ is connected to the button-side conducting plate 21, the central point $b$ between resistance $R_2$ and resistance $R_3$ is connected to the central conducting plate 20, and further, the other end $c$ of resistance $R_3$ is connected to the contra button-side conducting plate 22.

Description will hereinafter be made with respect to the operation of the present invention embodied in the preceding example.

When a pencil 31 being sharpened is inserted through the pencil guiding bore 11 of the socket member 12, the power switch 10 circuit is closed as shown in FIGURE 4A, by the function of an operating member 38 to start the motor 7, impart rotation to the cutter holder 1 and thus begin the pencil 31 sharpening operation. At this time, in the lamp 25 circuit, the button-side conducting plate 21 of the switch 18, being in contact with said central conducting plate 20, the lamp 25 will not be energized because there is an internal resistance through the lamp 25 and the power energy is consumed across resistances $R_1$ and $R_3$, the result being that the lamp 25 is not lit. As the sharpening operation goes on until the lead point 32 of the pencil 31 is substantially sharpened as shown in FIGURE 4B, the sliding rod 13 slides axially, being pushed by the pencil point, whereby the button 19 is pushed by abutment plate 24 through the function of switch 18 and the central conducting plate 20 comes apart from the button-side conducting plate 21 so that the lamp 25 circuit is energized across resistances $R_1$, $R_2$ and $R_3$ and thus the lamp is lit dim. When the lead point 32 is cut sharp enough by further sharpening operation and the pencil sharpening has been completed as shown in FIGURE 4C, the sliding rod 13, being pushed by the lead point 32, slides more distance axially and the button 19 for the switch 18 is likewise subjected to the increased axial pressure, as a result of which the central conducting plate 20 comes into contact with the contra button-side conducting plate 22, this meaning that resistance $R_3$ is shortcircuited to leave only resistance $R_2$ and $R_1$ remaining in the lamp circuit so that the lamp 25 is supplied with a greater amount of electric current and beams brighter.

It is to be noted that in those preferred embodiments of the present invention described hereinabove, the lamp 25 is strategically disposed in the front face of the upper casing 26 so as to be easily accessible by the operator, and is adapted to minimize shock current which might be inflicted thereon in such cases when the electrical insulation be impaired by the pencil shavings intruding into the lamp section since resistances $R_1$ and $R_2$ are contained in said lamp circuit but subject to the resistance across $R_1$ and $R_2$ being selected in proper amount: for example, with 120 v. of voltage at the power source and 33 KΩ of resistance each across $R_1$ and $R_2$, the assumed shock current will be under 5 ma. which is a figure warranting an absolute safety from danger, and furthermore, said resistance across $R_1$ and $R_2$ will serve as ballast resistance functioning in favor of a neon lamp.

Figure 6C:
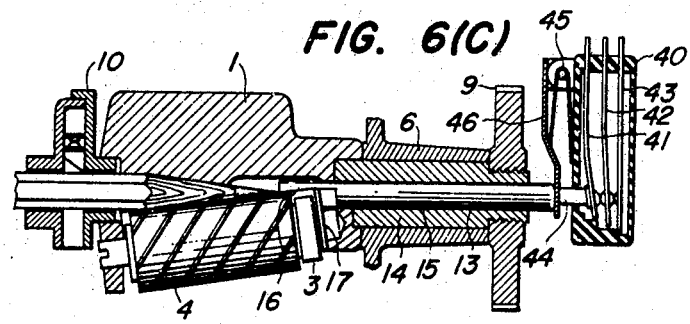
Figure 7:
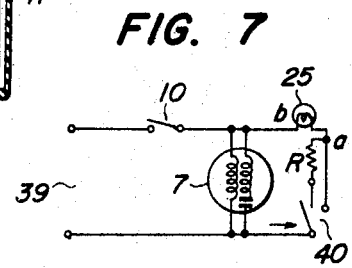
FIGURE 7 is a wiring diagram for the sharpener unit shown in FIGURES 6A, 6B and 6C.

Next, description will be made with regard to the preferred embodiment of the present invention shown in FIGURES 6A, 6B and 6C. The mechanical structure of this example, however, will be left out from description since it is quite identical with that of the preceding example and an account will be given specifically on the indicator switch and electric circuitry. The switch 40 consists of three conducting plates 41, 42 and 43 which normally stay apart from each other respectively, a button 44 which is in abutment upon a conducting plate 41, and an abutment plate 46 which is urged by a coil spring 45 in the separating direction. The electric circuit is formed, as shown in FIGURE 7, with the motor 7 connected across the power switch 10 to the power source via power plug 39 and with the lamp circuit connected in parallel with the circuit of said motor 7.

In said lamp circuit, one end of the motor circuit is connected to the central conducting plate 42 of the switch 40, the button-side conducting plate 41 is connected across resistance R to one terminal (a) of said lamp 25, the contra button-side conducting plate 43 is connected to one terminal (a) of said lamp 25, while the other terminal (b) of said lamp 25 is connected to the other end of said motor circuit. Incidentally, a filament lamp is used as an indicator lamp in this example of the present invention.

Description will be made in the following with respect to the operation of the present invention embodied in this example. When a pencil to be sharpened is inserted through the socket member, the power switch 10 is operated to close, as shown in FIGURE 6A, to start the motor 7, rotate the cutter holder 1, and thus begin the pencil sharpening operation. And as the sharpening operation goes on until the lead point of the pencil is substantially sharpened, as shown in FIGURE 6B, the sliding rod 13, being pushed by the lead point of the pencil, makes axial sliding movement. The switch 40, in turn, being likewise pushed of its button 44, the central conducting plate 42 comes in contact with the button-side conducting plate 41. This results in the lamp 25 being connected across resistance R to the power source and a low voltage is applied to the lamp 25 to light it dim. When the lead point of the pencil is cut sharp enough by further sharpening operation as shown in FIGURE 6C and the sharpening operation has been completed, the sliding rod 13 makes further axial sliding movement, being pushed by the lead point of the pencil with the button 44 of the switch 40 being likewise pushed further on, the result being that the central conducting plate 42 comes in contact with the contra button-side conducting plate 43, whereby a voltage is impressed on the lamp 25 without regard to resistance to cause the lamp 25 to beam brighter.

According to the preceding example embodying the present invention, it functions to the effect that the indicator lamp is lit dim when the lead point of the pencil is substantially sharpened during the operation or is cut to a dull condition of point, while the lamp beams brighter as the pencil point is cut sharp enough, the resistance through the lamp circuit being reduced then. As may be readily appreciated from this, withdrawal of the loaded pencil from the pencil sharpener unit at the time the indicator lamp is lit dim will provide a satisfactory dull point when this is needed for some reason or other, with color pencils for example, or withdrawal of the pencil under operation after the indicator lamp shines brighter will provide a point sharp enough as desired, thus enabling it to obtain very conveniently a pencil point of desired degree of finish as may suit the purpose and besides, obtain a sharpener unit comprising only one single indicator lamp, which is naturally less expensive. The most preferable differential in the lit conditions of indicator lamp to be selected between "dim" and "bright," at which the lamp is best observable ranges in terms of ratio from 1:5 to 1:12 as representing either case in common where resistance across the lamp circuit is reduced or where it is not reduced.

In addition, according to the present invention, such an electric pencil sharpener as described in the following is also possible.

Figure 8:
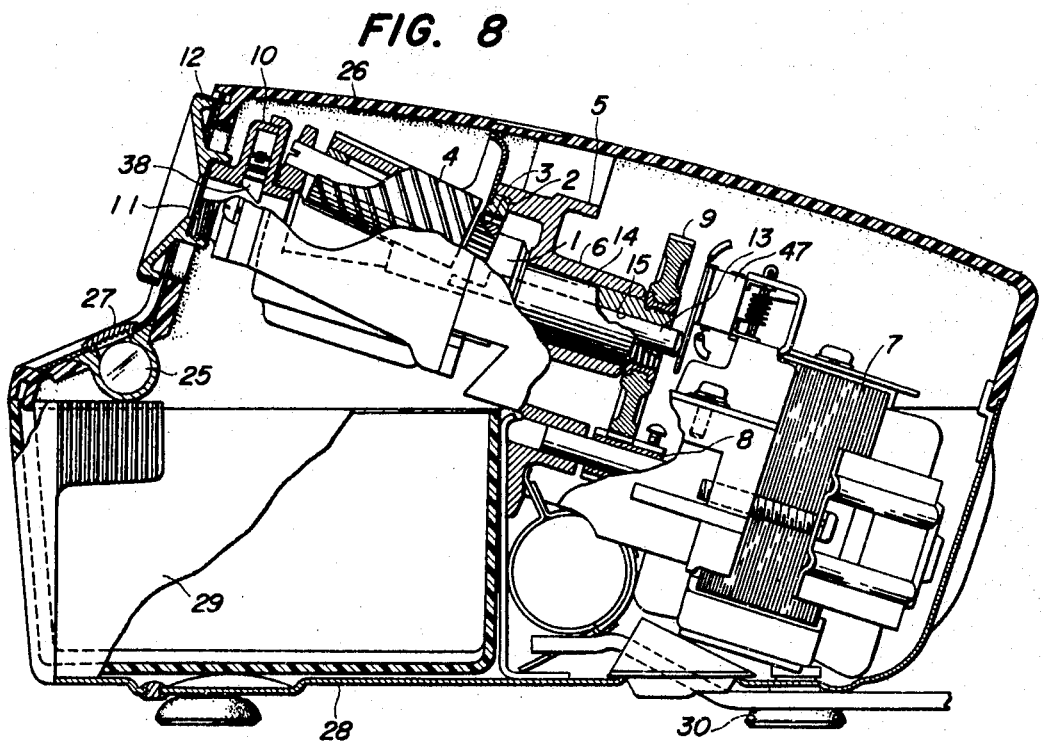
FIGURE 8 is a vertical sectional side view of the essential part of an electric pencil sharpener shown as an example different from those mentioned in the above of the present invention.

The example of the present invention shown in FIGURE 8 comprises the same mechanical structure as that shown in FIGURE 1. Like components designated by similar characters of reference in the examples of said both figures have identical structure or identical function, respectively.

In FIGURE 8, reference numeral 47 designates an indicator switch which functions to effect contact and separation between two conducting plates.

Figure 9:
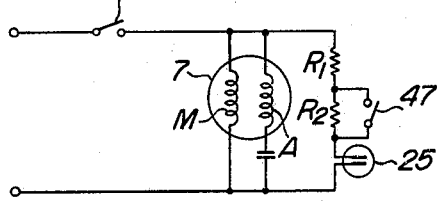
FIGURES 9, 10, 11 and 12 are wiring diagrams for the sharpener unit shown in FIGURE 8.

The electric circuit is formed, as shown in FIGURE 9, with a series circuit of lamp including ballast resistance $R_1$, controlling resistance $R_2$ and an indicator lamp 25 in the form of a neon lamp herein applied as constituting a preferred embodiment of the present invention being connected in parallel with the circuit of motor 7, and the indicator lamp 25 being connected in parallel with said controlling resistance $R_2$.

Figure 10:
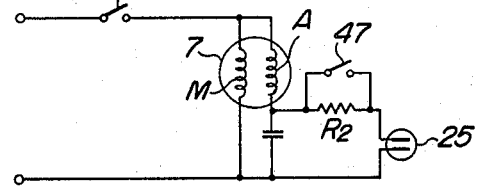
Figure 11:
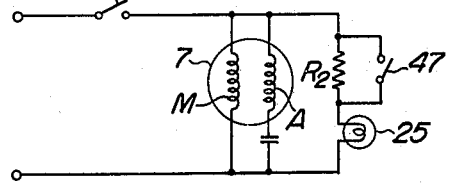
Figure 12:
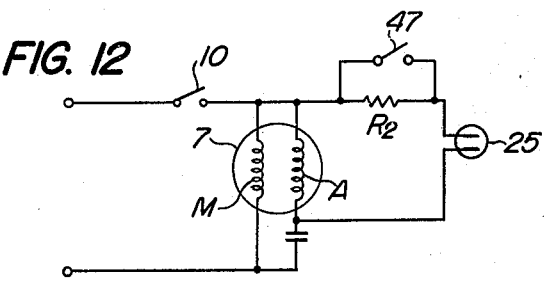

In the operation of this example of the present invention, when a pencil is inserted through the socket member 12, the power switch 10 is operated to close and thereby start the motor 7. Simultaneously as the pencil sharpening operation is thus started, the indicator lamp 25 connected in parallel with the circuit of motor 7 is also energized across ballast resistance $R_1$ and controlling resistance $R_2$, and is lit to signal energizing of the motor 7. And as sharpening operation goes on until the lead point of the loaded pencil is cut sharp enough and the sharpening operation has been completed, the sliding rod 13 is pushed to thereby actuate the indicator switch 47, and due to this indicator switch 47 being connected in parallel with the circuit of controlling resistance $R_2$, this resistance $R_2$ is short-circuited, the result therefore being that only ballast resistance $R_1$ remains contained in the lamp circuit and the lamp 25 beams brighter than at the time it signalled energizing of the motor, thus informing the operator of completion of the sharpening operation. As for the forms of electric circuit, those shown in FIGURES 10, 11 and 12 may be used as alternatives for the one shown in FIGURE 9.

According to the example of the present invention described hereinabove, an extremely rationalized electric pencil sharpener is obtained, in the operation of which the motor is started upon insertion of a pencil to begin the sharpening operation and simultaneously with this, the indicator lamp is lit dim to thereby signal energizing of the motor, while as the loaded pencil is cut sharp enough, the indicator switch is actuated being pushed by the lead point of the pencil so that the resistance through the circuit of the indicator lamp is reduced to cause the indicator lamp to beam brighter and thus signal completion of the sharpening operation, whereby either energizing of the motor or completion of the sharpening operation is indicated by dim or bright condition of light of only one single indicator lamp incorporated in the sharpener unit. While the foregoing is intended as illustrative of the details of possible examples embodying the present invention, it is to be understood that the forms of indicating means herein described are not limited to a neon lamp or a filament lamp such as referred to in the description of the foregoing examples, and that the invention is not limited to the described examples only and numerous changes may be made therein without departing from the thought of the present invention.

What is claimed is:

1. An electric pencil sharpener and comprising a switch and a motor, said switch adapted to close upon insertion of a pencil into the electric pencil sharpener and open upon withdrawal of the same therefrom; cutter means operated by said motor for sharpening pencils; an indication lamp having at least two modes of operation, each mode indicative of a stage in the pencil sharpening operation; switch means having a number of switching positions equal in number to the number of operating modes of said indicator lamp and serving to control the mode in which said indicator lamp operates; resistor means associated with a control circuit including said indicator lamp means and said switch means, the switching position of said switch means determining the manner in which said resistor means is connected in said control circuit and thereby determining the mode in which said indicator lamp operates; and means responsive to the stage in the pencil sharpening operation for controlling the switching position of said switch means.

2. An electric pencil sharpener and comprising: a switch and a motor, said switch adapted to close upon insertion of a pencil into the electric pencil sharpener and open upon withdrawal of the same therefrom; a cutter holder adapted to be operated by said motor; a cutter rotatably mounted on said cutter holder; an internal gear firmly secured to a frame having a bearing portion for supporting said cutter holder and in meshing engagement with a pinion firmly secured to said cutter; a sliding rod extending through a bore formed in the center of a drive shaft of the cutter holder for axial sliding motion therein; and indicator lamp switch having a plurality of contact elements actuated to open or close upon being pushed through said sliding rod by the tip of the lead of a pencil to be sharpened; and an indicator lamp circuit adapted to be energized upon actuation of said indicator lamp switch, said indicator lamp circuit comprising an indicator lamp, a resistor connected in series to said indicator lamp, and a bypass circuit forming an electric bypass through said contact elements with respect to said resistor.

3. An electric pencil sharpener and comprising: a switch and a motor, said switch adapted to close upon insertion of a pencil into the electric pencil sharpener and open upon withdrawal of the same therefrom; a cutter holder adapted to be operated by said motor; a cutter rotatably mounted on said cutter holder; an internal gear firmly secured to a frame having a bearing portion for supporting said cutter holder and in meshing engagement with a pinion firmly secured to said cutter; a sliding rod extending through a bore formed in the center of a drive shaft of the cutter holder for axial sliding motion therein; an indicator lamp switch having a plurality of contact elements progressively actuated to open or close upon being pushed through said sliding rod by the tip of the lead of a pencil to be sharpened; and an indicator lamp circuit adapted to be energized upon actuation of said indicator lamp switch, said indicator lamp circuit comprisng a resistor circuit having a resistance value which varies upon actuation of said contact elements of said indicator switch and an indicator lamp connected in series to said resistor circuit.

4. An electric pencil sharpener and comprising: a switch and a motor, said switch adapted to close upon insertion of a pencil into the electric pencil sharpener and open upon withdrawal of the same therefrom; a cutter holder adapted to be operated by said motor; a cutter rotatably mounted on said cutter holder; an internal gear firmly secured to a frame having a bearing portion for supporting said cutter holder and in meshing engagement with a pinion firmly secured to said cutter; a sliding rod extending through a bore formed in the center of a drive shaft of the cutter holder for axial sliding motion therein; an indicator lamp switch having a first contact element adapted to be displaced upon being pushed through said sliding rod by the tip of the lead of a pencil to be sharpened, a second contact element normally maintained in engagement with said first contact element and disengaging itself therefrom upon displacement thereof, and a third contact element normally maintained out of engagement with said first contact element and brought into engagement therewith upon displacement thereof; and an indicator lamp circuit adapted to be energized upon actuation of said indicator lamp switch, said indicator lamp circuit comprising a resistor and an indicator lamp connected in series to said resistor, the point of connection of said resistor and said indicator lamp being connected to said first contact element, the remaining terminal of said indicator lamp being connected to said second contact element, and the remaining terminal of said indicator lamp being connected to said third contact element of said indicator switch, respectively.

5. An electric pencil sharpener and comprising: a switch and a motor, said switch adapted to close upon insertion of a pencil into the electric pencil sharpener and open upon withdrawal of the same therefrom; a cutter holder adapted to be operated by said motor; a cutter rotatably mounted on said cutter holder; an internal gear firmly secured to a frame having a bearing portion for supporting said cutter holder and in meshing engagement with a pinion firmly secured to said cutter; a sliding rod extending through a bore formed in the center of a drive shaft of the cutter holder for axial sliding motion therein; an indicator lamp switch having a first contact element adapted to be displaced upon being pushed through said sliding rod by the tip of the lead of a pencil to be sharpened, a second contact element normally maintained in engagement with said first contact element and disengaging itself therefrom upon displacement thereof, and a third contact element normally maintained out of engagement with said first contact element and brought into engagement therewith upon displacement thereof; and an indicator lamp circuit adapted to be energized upon actuation of said indicator lamp switch, said indicator lamp circuit comprising a first resistor, an indicator lamp, a second resistor and a third resistor connected in series with the indicator lamp to form a series circuit, the point of connection of said second resistor and said third resistor being connected to said first contact element, the point of connection of said first resistor and said indicator lamp being connected to said second contact element, and the opposite terminal of said third resistor being connected to said third contact element of said indicator light switch, respectively.

6. An electric pencil sharpener and comprising: a switch and a motor, said switch adapted to close upon insertion of a pencil in the electric pencil sharpener and open upon withdrawal of the same therefrom; a cutter holder adapted to be operated by said motor; a cutter rotatably mounted on said cutter holder; an internal gear firmly secured to a frame having a bearing portion for supporting said cutter holder and in meshing engagement with a pinion firmly secured to said cutter; a sliding rod extending through a bore formed in the center of a drive shaft of the cutter holder for axial sliding motion therein; an indicator lamp switch comprising first, second and third contact elements which are normally open circuited, said first contact element being adapted to be displaced upon being pushed through said sliding rod by the tip of the lead of a pencil to be sharpened and said second and third contact elements being brought successively into engagement with the first contact element as the amount of displacement of the latter increases; and an indicator lamp circuit adapted to be energized upon actuation of said indicator lamp switch, said indicator lamp circuit comprising an indicator lamp which is connected in series to said second and third contact elements of said indicator switch and a resistor connected across said first and third contact elements of said indicator switch.

7. An electric pencil sharpener and comprising: a switch and a motor, said switch adapted to close upon insertion of a pencil into the electric pencil sharpener and open upon withdrawal of the same therefrom; a cutter holder adapted to be operated by said motor; a cutter rotatably mounted on said cutter holder; an internal gear firmly secured to a frame having a bearing portion for supporting said cutter holder and in meshing engagement with a pinion firmly secured to said cutter; a sliding rod extending through a bore formed in the center of a drive shaft of the cutter holder for axial sliding motion therein; an indicator lamp switch having a plurality of contact elements actuated to open and close upon being pushed through said sliding rod by the tip of the lead of a pencil to be sharpened; and an indicator lamp circuit adapted to be energized upon actuation of said indicator lamp switch, said indicator lamp circuit comprising an indicator lamp and a resistor connected in series to said motor circuit, said resistor further being connected in parallel to said indicator lamp switch.

References Cited

UNITED STATES PATENTS

| | | | |
|---|---|---|---|
| 2,780,813 | 2/1957 | Tritt | 30—265 X |
| 3,134,365 | 5/1964 | Hori | 144—28.5 |

ANDREW R. JUHASZ, Primary Examiner

J. F. COAN, Assistant Examiner

U.S. Cl. X.R.

144—30, 28.72